Figure 1:
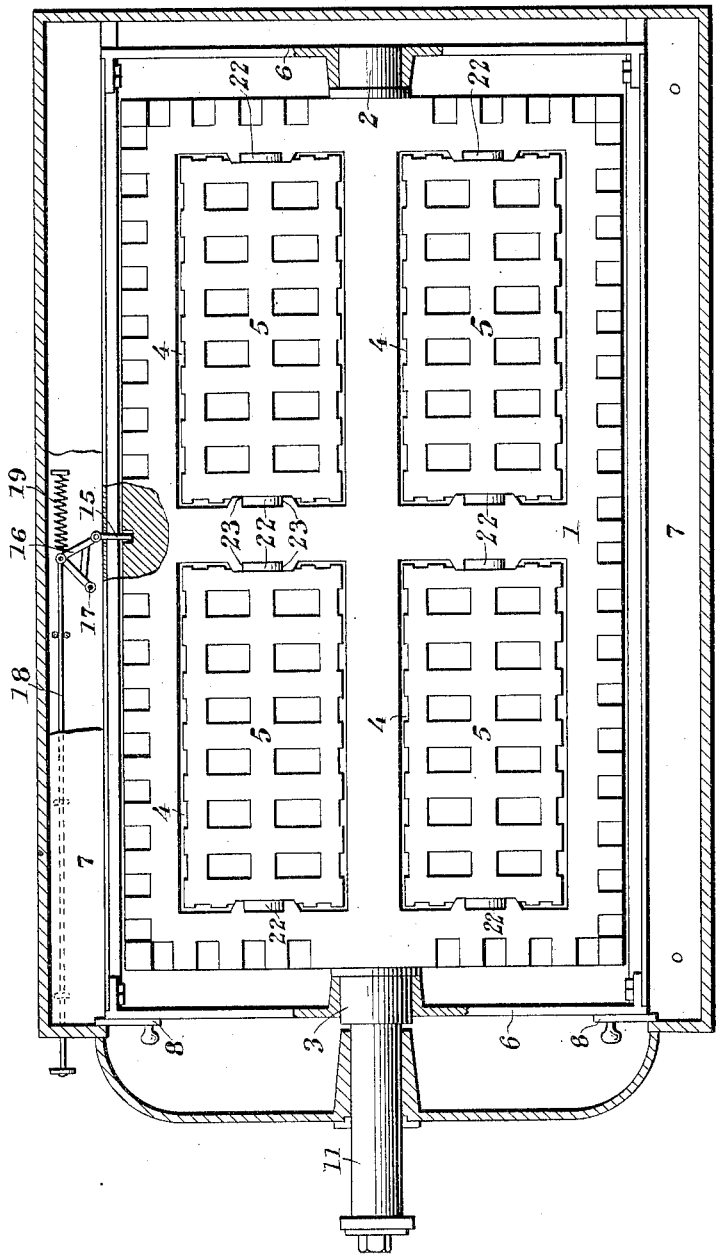

H. F. LANGENHOP.
GRATE.
APPLICATION FILED NOV. 12, 1912.

1,089,231.

Patented Mar. 3, 1914.
3 SHEETS—SHEET 1.

Inventor
Herman F. Langenhop

Witnesses
M. F. Garnett
U. B. Hillyard.

By Victor J. Evans
Attorney

H. F. LANGENHOP.
GRATE.
APPLICATION FILED NOV. 12, 1912.
1,089,231.
Patented Mar. 3, 1914.
3 SHEETS—SHEET 2.
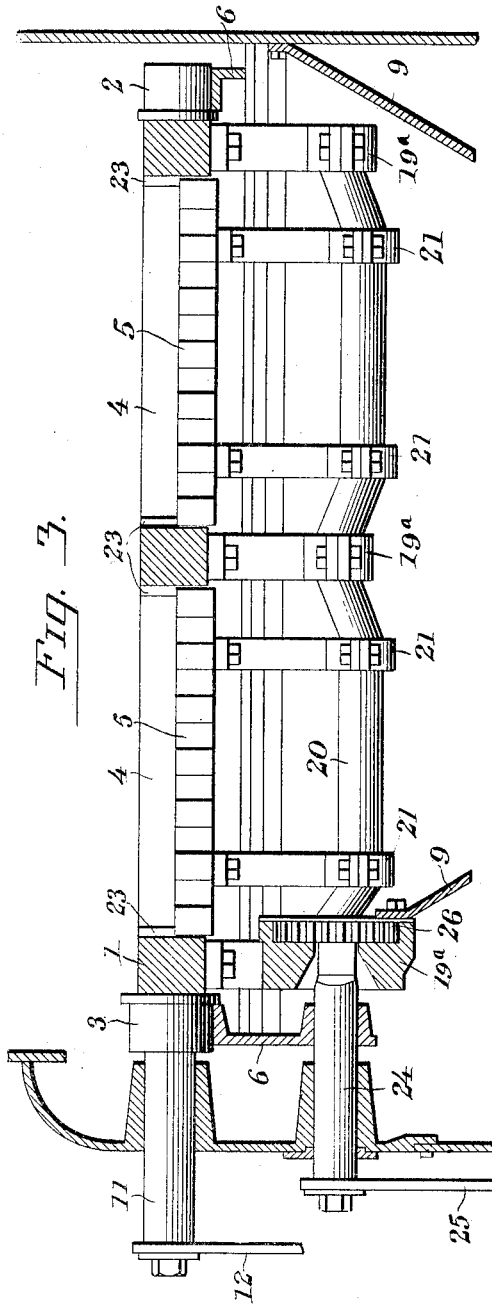
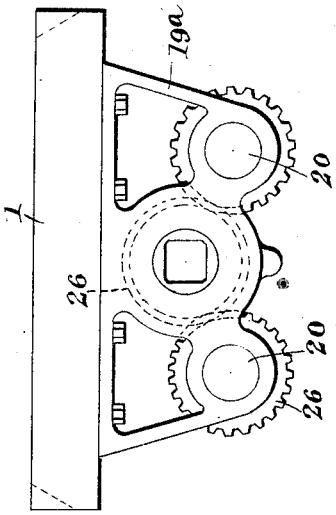
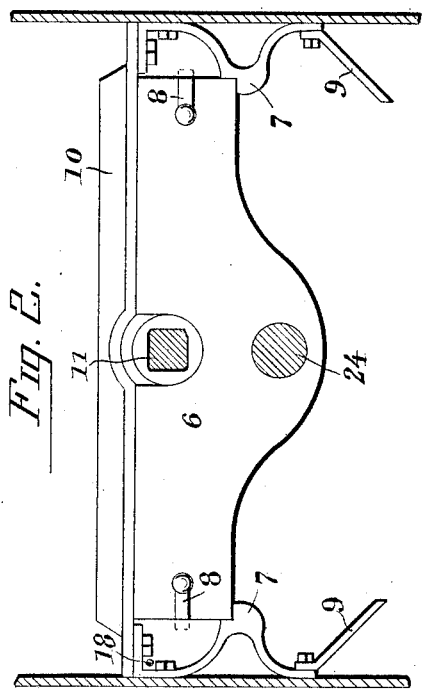
Inventor
Herman F. Langenhop
By Victor J. Evans
Attorney
Witnesses
M. F. Hammett
V. B. Hillyard H. F. LANGENHOP.
GRATE.
APPLICATION FILED NOV. 12, 1912.
1,089,231.
Patented Mar. 3, 1914.
3 SHEETS—SHEET 3.
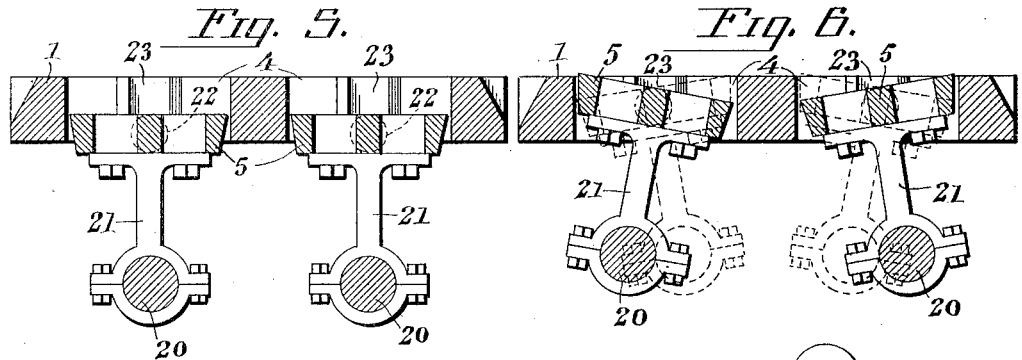
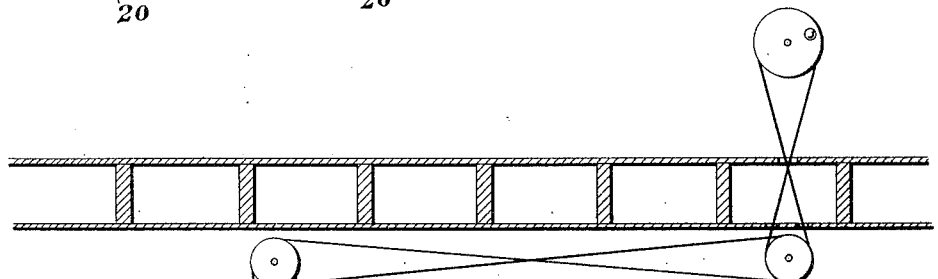
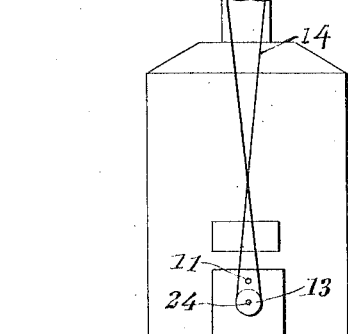
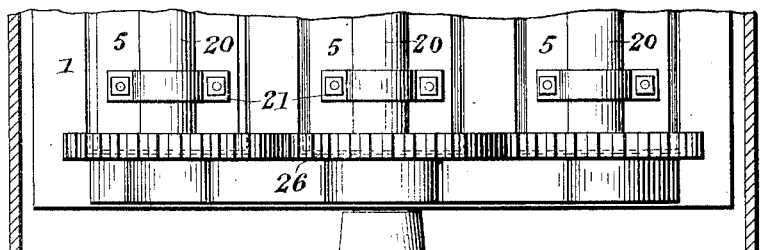
Inventor
Herman F. Langenhop
By Victor J. Evans
Attorney
Witnesses
M. F. Garnett
U. B. Hillyard

UNITED STATES PATENT OFFICE.

HERMAN F. LANGENHOP, OF CHAPPAQUA, NEW YORK.

GRATE.

1,089,231. Specification of Letters Patent. Patented Mar. 3, 1914.

Application filed November 12, 1912. Serial No. 730,950.

*To all whom it may concern:*

Be it known that I, HERMAN F. LANGENHOP, citizen of the United States, residing at Chappaqua, in the county of Westchester and State of New York, have invented new and useful Improvements in Grates, of which the following is a specification.

The purpose of this invention is the provision of a grate which may be easily and conveniently dumped and which may be kept clear of ashes, cinders and like accumulations so that ample provision may be had for draft when a brisk fire is required.

The invention is of such a nature as to be adapted to grates for kitchen ranges, cook stoves, heaters and steam and hot water furnaces generally, the grate being mounted to turn as a whole for dumping and provided with sections which may be moved when required to dislodge ashes and cinders, whereby such accumulations may be discharged to admit of a free supply of air to the fuel.

The invention resides in the peculiar construction of the grate, the mountings therefor, the agitator sections, the operating means for such agitator sections and such adjunctive parts which hereinafter will be set forth more in detail and pointed out in the appended claim.

The invention consists of the novel features, details of construction and combination of parts, which hereinafter will be more particularly set forth, illustrated in the accompanying drawings, and pointed out in the appended claim.

Referring to the drawings, forming a part of the specification, Figure 1 is a top plan view of a grate embodying the invention. Fig. 2 is a front view of the grate and the mountings therefor. Fig. 3 is a longitudinal section. Fig. 4 is an end view of the grate, showing the crank shafts for the agitator and the supporting means therefor. Fig. 5 is a transverse section of the grate, showing the agitators in operative position. Fig. 6 is a detail view, showing the extreme positions of the agitators by full and dotted lines. Fig. 7 is a modification, showing three sets of agitators connected for simultaneous operation. Fig. 8 is a detail view, showing one way of operating the agitators from a point distant from the furnace.

Corresponding and like parts are referred to in the following description, and indicated in all the views of the drawings, by the same reference characters.

It is to be understood that in the specific adaptation of the invention to particular and special types of heaters and furnaces the details will vary, but the essential feature of the invention will be the same and consists of the grate proper mounted to dump and provided with agitator sections which are adapted to be operated to remove ashes, clinkers and the like so as to insure an ample supply of air for supporting combustion.

The grate proper is designated at 1 and is provided with trunnions 2 and 3 by means of which the grate is mounted to admit of its turning when it is required to dump the fire or coals. The grate may be of any construction and outline depending upon the form of the fire pot and has a plurality of openings or spaces 4 in which are located the agitators 5. The grate rest consists of a frame 6 which may be of any substantial construction, opposite bars being provided with depressions to form bearings in which the trunnions 2 and 3 are fitted. The grate rest 6 is supported upon brackets 7, which are bolted or otherwise secured to the sides of the fire pot or combustion chamber of the heater, stove or furnace provided with the invention. The grate rest is slidable upon the supports 7 so as to be easily placed in position or removed as required. Catches 8 secure the grate rest when slipped into position in the fire pot. Deflecting plates 9 are located at the sides of the fire pot below the grate to direct the ashes into the central portion of the ash pit.

Channel irons 10 are supported upon the grate rest and are adapted to receive the fire brick or water-back. The channel irons supported upon the end bars of the grate rest extend over and close the depressions in the upper edges thereof in which the trunnions 2 and 3 are fitted. The trunnion 3 is hollow and is adapted to have a shaft 11 fitted thereto. This shaft may have a crank 12 fitted to its outer end. Shaft 24 may be supplied with a pulley 13, the latter receiving an operating belt 14 whereby the agitator may be moved from any convenient point distant from the heater, stove or furnace, as indicated in Fig. 8.

It is proposed to secure the grate from turning to prevent accidental dumping and for this purpose a catch 15 is mounted upon a bar of the grate rest and is connected to a bell crank 16, which is pivoted at 17 to the grate rest. A rod or bar 18 mounted in keepers and extending through the front of the furnace has its inner end yieldably connected with the bell crank 16 by passing through an opening of such bell crank and having an expansible helical spring 19. A pull upon the rod 18 withdraws the catch 15 from engagement with the grate, thereby admitting of the latter being turned to dump the fire or dead coals.

The brackets 19ª are bolted or otherwise secured to the grate 1 and support crank shafts 20. The agitators 5 have hangers 21 which are mounted upon the crank portions of the crank shafts. When the crank shafts are rotated the lower ends of the hangers 21 receive an up and down and a lateral movement, with the result that the agitators are reciprocated vertically and at the same time have an oscillatory movement imparted thereto, as indicated by the full and dotted lines in Fig. 6. The edges of the agitators are beveled and in constructing the parts the agitators have a comparatively close fit in the openings or spaces 4, hence the up and down movement of the hangers 21 combined with the lateral movement of their lower ends causes the agitators to oscillate and to reciprocate vertically. Studs 22 are formed at the ends of the agitators and are arranged to operate in vertical guides 23 formed at the ends of the openings or spaces 4, thereby preventing binding of the agitators when in operation. A short shaft 24 may be fitted to the front end of each crank shaft 20 and an operating crank 25 may be fitted to the outer end of the short shaft 24. By this means either one of the crank shafts may be operated to actuate the agitators connected thereto. In case it be desired to operate all the agitators at one time the crank shafts may be connected by means of gear wheels 26, which may be secured to the front ends thereof in any manner and by fitting the shaft 24 to any one of the gear wheels or crank shafts all may be operated at one time.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claim appended hereto.

Having thus described the invention what is claimed as new, is:—

In combination a grate provided with rows of oblong openings having centrally disposed vertical guides at their ends, brackets pendent from the grate, crank shafts mounted in said brackets and located in line with the said vertical guides, agitators located in the openings of the grate and provided at their ends with studs which engage the vertical guides and coöperate therewith to hold the agitators in proper position, hangers pendent from the agitators and mounted upon the crank portions of the crank shafts, and means for imparting a rotary movement to the crank shafts to cause the agitators to receive a combined vertical reciprocating and laterally rocking motion.

In testimony whereof I affix my signature in presence of two witnesses.

HERMAN F. LANGENHOP.

Witnesses:
ARCHER W. BEDELL,
EDWIN BEDELL.

---

Copies of this patent may be obtained for five cents each, by addressing the "Commissioner of Patents Washington, D. C."